(12) United States Patent
Callis, Jr. et al.

(10) Patent No.: US 10,455,187 B2
(45) Date of Patent: Oct. 22, 2019

(54) 360° CAMERA SYSTEM (71) Applicant: LIBERATOR 360, LLC, Humble, TX (US)

(72) Inventors: Clarence Andrew Callis, Jr., Humble, TX (US); Josh Landon Duncan, Tomball, TX (US)

(73) Assignee: LIBERATOR 360, LLC, Humble, TX (US)

( * ) Notice: Subject to any disclaimer, the term of this patent is extended or adjusted under 35 U.S.C. 154(b) by 0 days.

(21) Appl. No.: 15/945,400

(22) Filed: Apr. 4, 2018

(65) Prior Publication Data
US 2018/0295316 A1 Oct. 11, 2018

Related U.S. Application Data
(60) Provisional application No. 62/481,958, filed on Apr. 5, 2017.

(51) Int. Cl.
| | | |
|---|---|---|
| *H04N 5/77* | (2006.01) | |
| *H04N 7/18* | (2006.01) | |
| *H04N 5/232* | (2006.01) | |
| *B64C 39/02* | (2006.01) | |
| *B64D 47/08* | (2006.01) | |
| *H04N 5/247* | (2006.01) | |

(52) U.S. Cl.
CPC ............. *H04N 5/77* (2013.01); *B64C 39/024* (2013.01); *B64D 47/08* (2013.01); *H04N 5/23206* (2013.01); *H04N 5/23238* (2013.01); *H04N 5/247* (2013.01); *H04N 7/188* (2013.01); *B64C 2201/127* (2013.01); *B64C 2201/146* (2013.01)

(58) Field of Classification Search
CPC .. H04N 7/181; H04N 5/247; G08B 13/19673; G08B 13/19667; G08B 13/196
USPC ........ 386/223, 224, 226, 227, 322, 323, 341
See application file for complete search history.

(56) References Cited

U.S. PATENT DOCUMENTS

| | | | |
|---|---|---|---|
| 8,228,364 B2 | 7/2012 | Cilia | |
| 10,011,230 B1* | 7/2018 | Brown | .................. H04N 7/181 |
| 2012/0093357 A1* | 4/2012 | Seder | .................. B60W 30/095 |
| | | | 382/103 |
| 2012/0302277 A1* | 11/2012 | Chang | .................. G07C 5/0866 |
| | | | 455/517 |

FOREIGN PATENT DOCUMENTS

KR 20150111578 A * 10/2015

* cited by examiner

*Primary Examiner* — Robert Chevalier
(74) *Attorney, Agent, or Firm* — Cozen O'Connor (57) ABSTRACT

A 360° camera system that eliminates problems associated with capturing real-time encounters between first responders, i.e., law enforcement personnel (such as police officers) and civilians such that all individuals involved in the encounter can be held accountable for their actions, wherein multiple cameras are provided, e.g., two to three cameras, consisting of cameras that acquire images in a 360° range, as opposed to conventional cameras that shoot up to a range of 170°, such that questions about sequence of events and their circumstances are eliminated.

16 Claims, 7 Drawing Sheets

360° CAMERA SYSTEM

CROSS-REFERENCE TO RELATED APPLICATION

This application claims priority from U.S. Provisional Application Ser. No. 62/481,070 filed Apr. 5, 2017, the content of which is hereby incorporated by reference in its entirety.

BACKGROUND OF THE INVENTION

1. Field of the Invention

The present invention relates to video recording and, more particularly, to a 360° camera system that eliminates problems associated with capturing real-time encounters between first responders, such as law enforcement personnel, and civilians.

2. Description of the Related Art

In recent years, tensions between police and civilians in the United States have risen. Subsequent to violent and/or deadly confrontations, the US civilian population increasingly question whether law enforcement officials (e.g., local police) overstepped their authority during these violent and/or deadly confrontations. During official reviews, police officers are often required to provide their account as to the events surrounding confrontations without much evidence to substantiate their version of events.

It is a given that a violent confrontation between a police officer and a civilian is an extremely fluid situation, with outcomes that occur in manner that a reasonable person would not expect, given the basis for the initial engagement between the police officer and the civilian. In an attempt to remedy this situation, many police departments have begun to implement body cameras in an attempt to capture contemporaneously the view of a police officer of an event as it happens. Often times, on the other hand, civilians are equipped with newer recording technology to also capture the event from their perspective and, in fact, have a better ability to do so. The problem that still persists in all of these situations is that often times the event is only partially recorded, and the entire story surrounding what happened is not told. For example, body cameras can fall off during physical contact, such as fights. Another problem is that civilians often start recording in the middle of an encounter, or even after the encounter happens. Lastly, not all police departments are equipped with body cameras. As a result of the foregoing problems, the major questions of "who is at fault" and "who is innocent" often remain unanswered.

One of the most widely known examples of in which the question of fault and innocence remained unanswered occurred in Ferguson, Mo. on Aug. 9, 2014. Here, a Caucasian police officer, Darren Wilson, shot and killed an unarmed 18 year old African American teenager, Michael Brown. Officer Wilson was not equipped with a body camera, while his vehicle was equipped with a standard forward facing windshield camera. During the encounter with Officer Wilson, Michael Brown stood to the left of the driver's side door, and therefore no video evidence of the encounter was created because Michael Brown was out-of-view of the windshield camera when he was shot and killed. The two main disputes in the case were whether Michael Brown attacked Officer Wilson in his vehicle and whether Michael Brown was shot while his hands were raised above his head and in the air. Without the ability of the police to provide a definitive answer to the question of innocent and/or guilt, the residents of Ferguson, Mo. were given the latitude to draw their own conclusion. As such, a presumption of innocence was drawn which sparked a riot that resulted in extensive property damage. Over all, the incident and the ensuing riots and damages cost the taxpayers 26 million dollars.

SUMMARY OF THE INVENTION

Disclosed is a 360° camera system that eliminates problems associated with capturing real-time encounters between first responders, i.e., law enforcement personnel (such as police officers) and civilians such that all individuals involved in the encounter can be held accountable for their actions, which will prevent further destruction of cities by eliminating question about the sequence of events and their circumstances.

In accordance with the invention, multiple cameras are provided, e.g., two to three cameras, consisting of cameras that acquire images in a 360° range, as opposed to conventional cameras that shoot up to a range of 170°. Alternatively, or in addition thereto, multiple cameras create a single 360° image. Here, one to two cameras are located or placed on top of the vehicle (depending on the size of the vehicle), and one camera is located in the inside of the vehicle. In this way, several 360° videos are captured, i.e., from outside the vehicle, inside the vehicle, and waist level at the windows of the vehicle.

With conventional systems, even if a police officer has a front facing camera, encounters can occur very quickly, and the police officer may not have time to activate the recording of the video system. The disclosed 360° camera system includes a software program that allows a dispatcher or a person at a central command center to view a live video feed of each of the cameras on the vehicle. The system provides the ability to move the view to any area of the 360° image being captured by any camera. As a result, after a police officer informs dispatch of his/her intention to approach a civilian during a routine stop or otherwise, the dispatcher can access a live feed view of the event as it happens. In this case, if the dispatcher sees the police officer is engaged in a struggle with a suspect, then the dispatcher has the ability to activate a recording system of the vehicle from their location. The 360° system, in accordance with the invention, eliminates the common "he-said-she-said" component of investigations or evidentiary proceedings, and likewise eliminates the problems associated with recording systems not always being activated when they need to be. Consequently, all parties to a confrontation are held accountable for their actions such that first responders (e.g., police officer) and the general public are provided with security by capturing the truth in a non-biased manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in greater detail below on the basis of the drawings in which exemplary embodiments of the invention are illustrated, in which.

DETAILED DESCRIPTION OF THE EXEMPLARY EMBODIMENTS

The following detailed description of specific embodiments of the inventive subject matter will be better understood when read in conjunction with the appended drawings. As used herein, an element or step recited in the singular and proceeded with the word "a" or "an" should be understood as not excluding plural of said element or step, unless such exclusion is explicitly stated. Furthermore, references to "embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
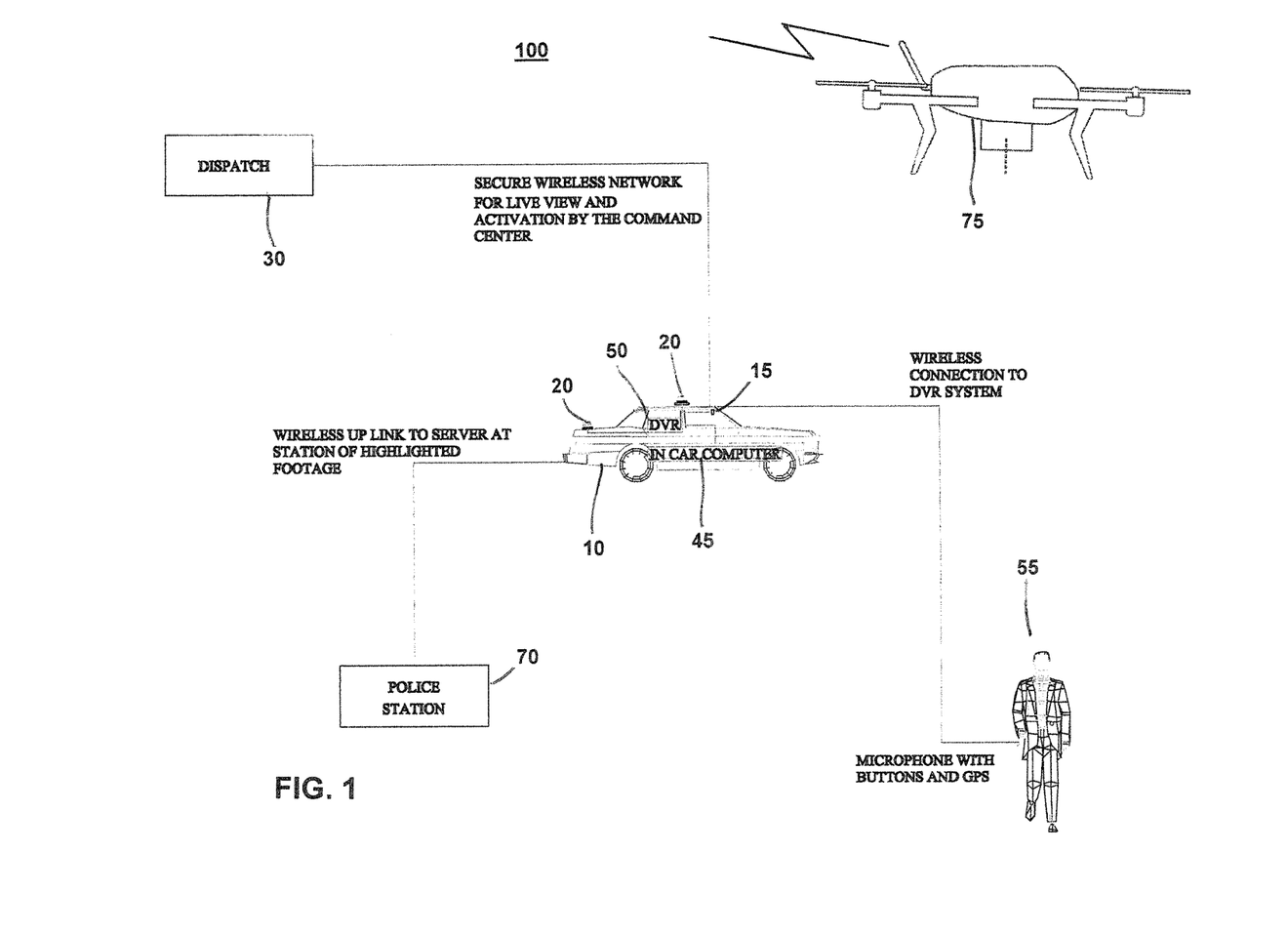
FIG. 1 is a schematic block diagram of the 360° camera system in accordance with the invention.

FIG. 1 is a schematic block diagram of the 360° camera system 100 in accordance with the invention. With reference to the FIG. 1, the 360° camera system 100 includes a vehicle 10 in which at least two 360° cameras 20 are provided. The vehicle 10, which includes a digital video recorder (DVR) 50 for temporarily storing recorded video footage until the vehicle 10 arrives within a secure Wi-Fi hotspot area located near the dispatcher or central command center 30, communicates via a wireless connection with a camera also worn by a first responder 55, such as a police officer and other emergency service provider. Also shown in FIG. 1 is a police station 70 at which a server 57 is provided, which is connected to the vehicle 10 via a wireless uplink over which highlighted footage is provided to the server 57. A mobile computer terminal 45 is also included in the vehicle. This computer 45 permits a user (e.g., a police officer) to access a live view of the 360° cameras 20 on the vehicle 10, as indicated diagrammatically via the multiple view shown in FIGS. 3A to 3E. The 360° camera system 100 also includes an airborne recording system 75, i.e., a drone, which permits the gathering of footage from an aerial perspective.

Figure 2:
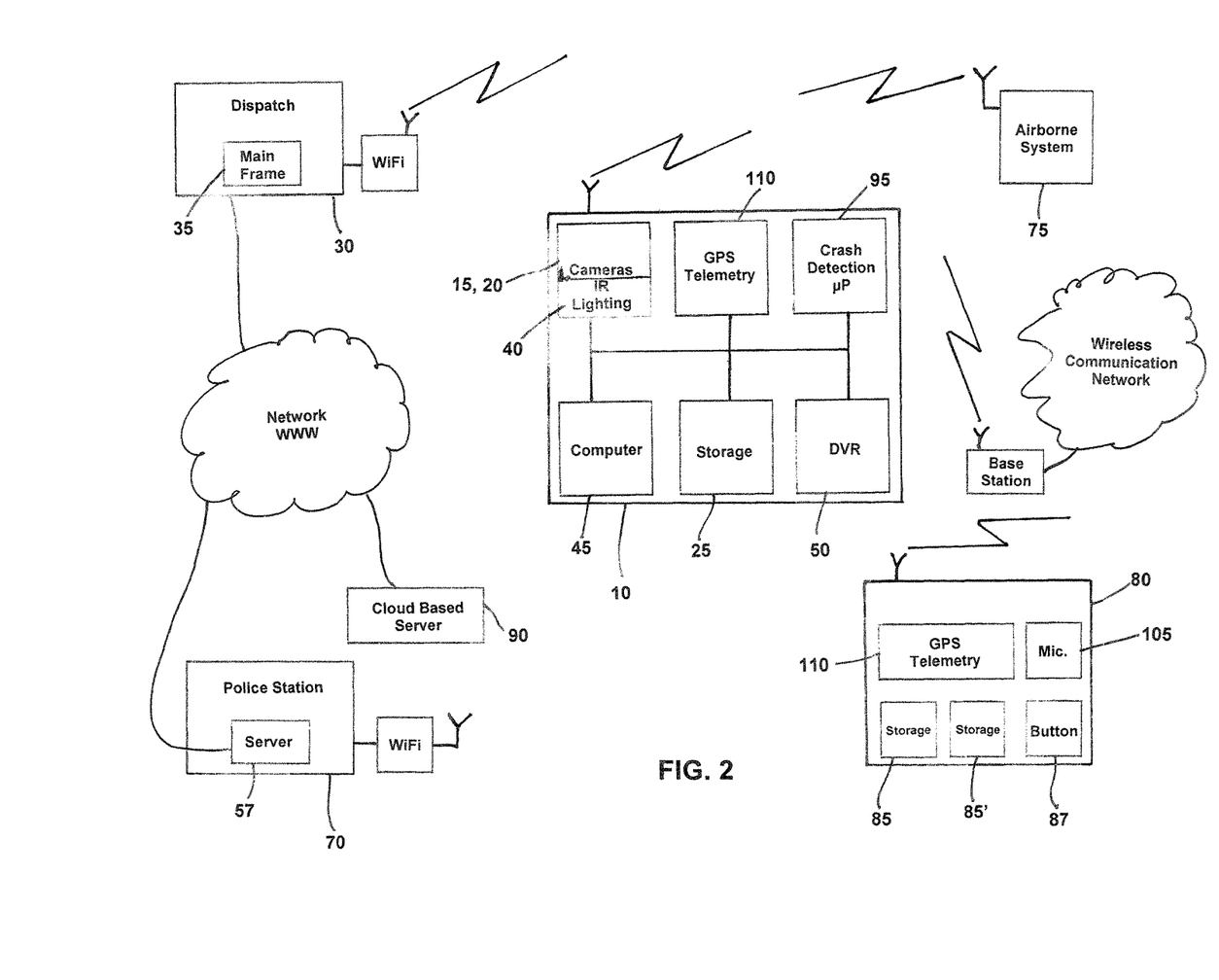
FIG. 2 is a detailed schematic block diagram of the schematic 360° camera system in accordance with the invention.
Figure 3A:
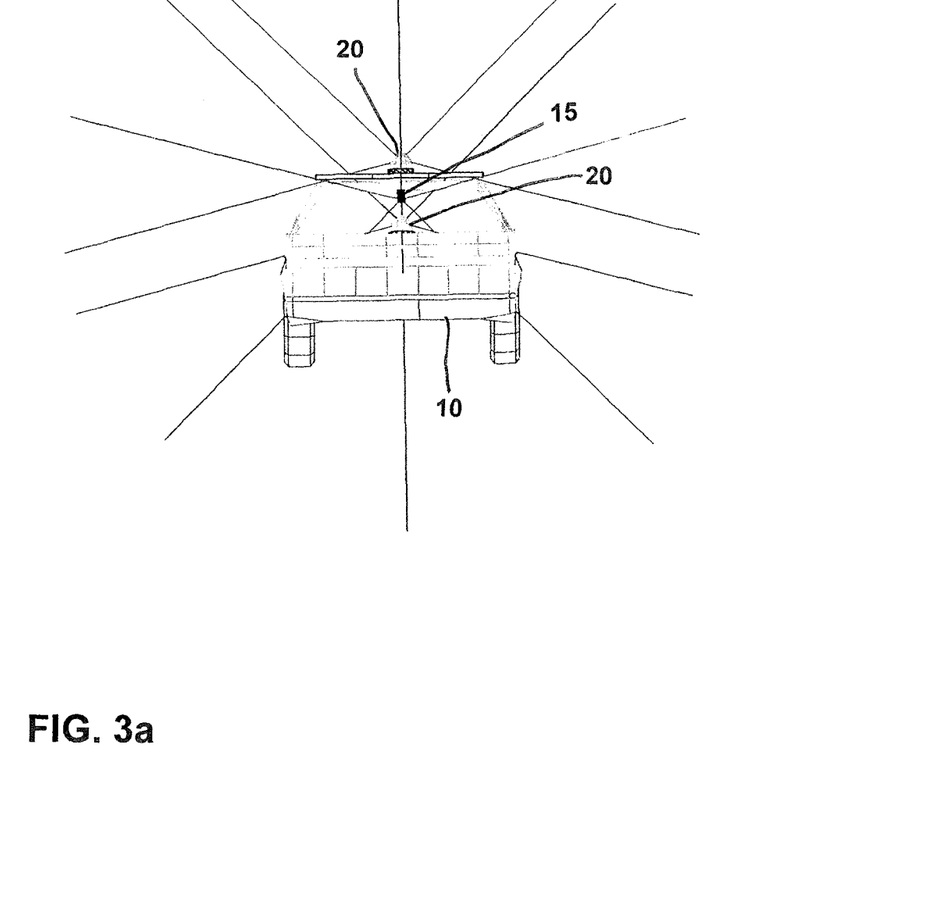
FIGS. 3A to 3E are illustrations showing the installation of the 360° camera system in accordance with the invention from various viewing angles of a vehicle.
Figure 3B:
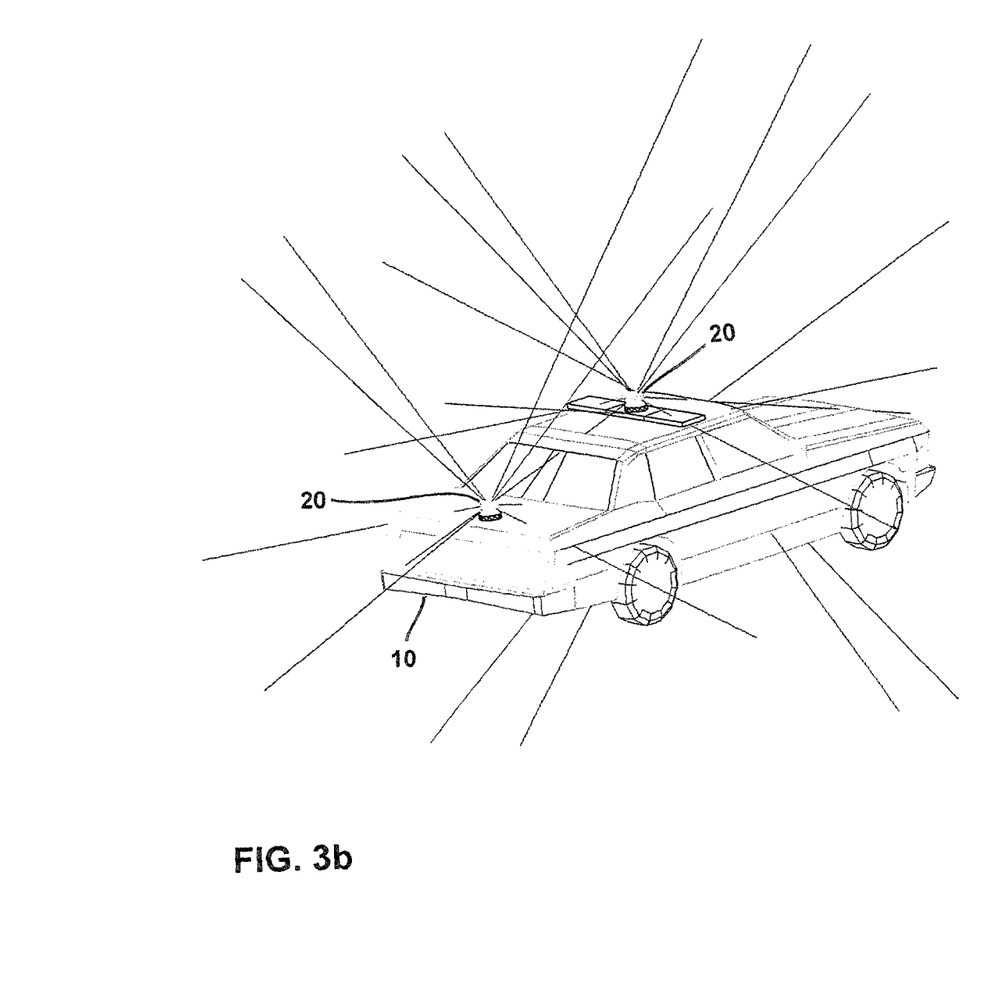
Figure 3C:
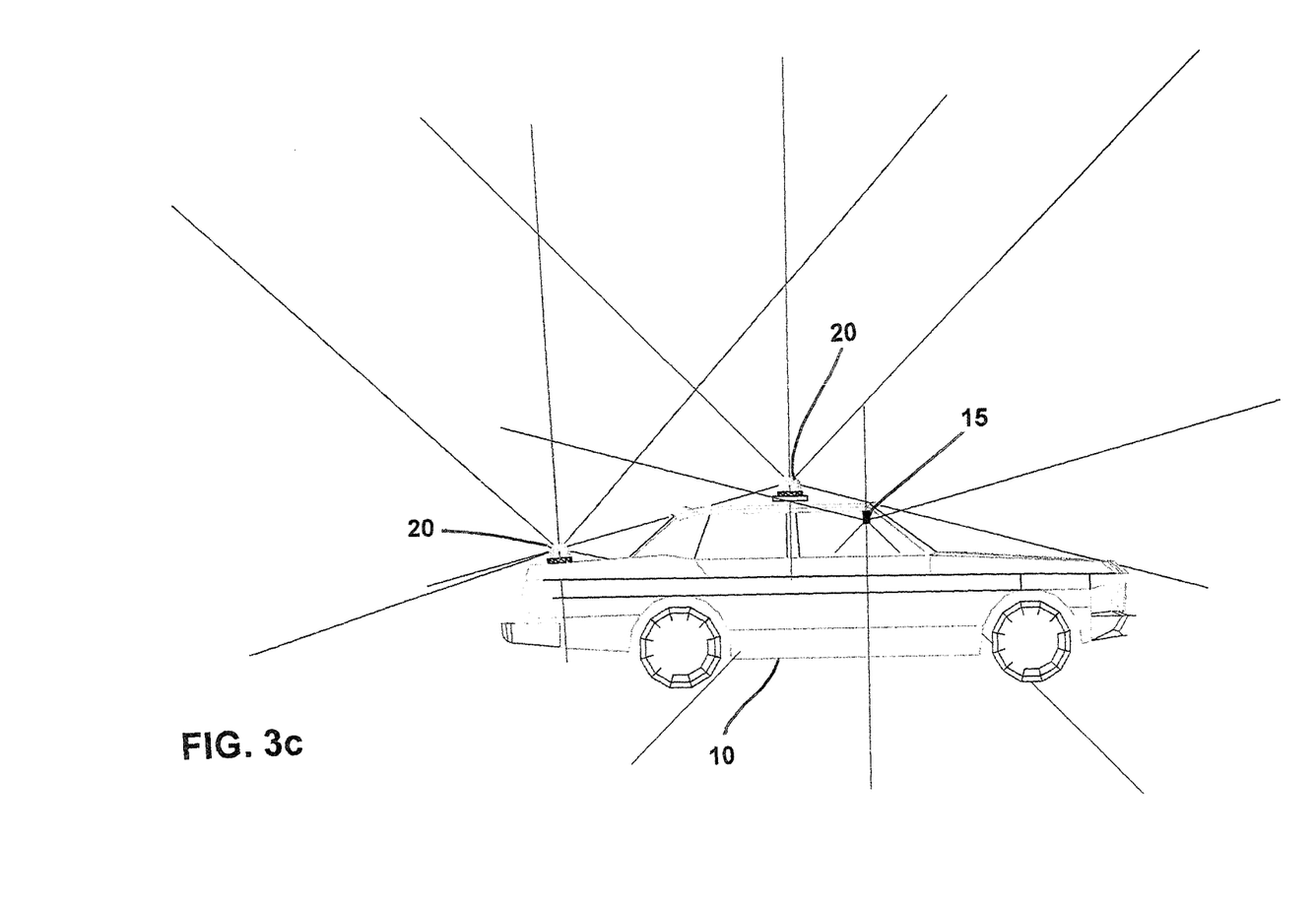
Figure 3D:
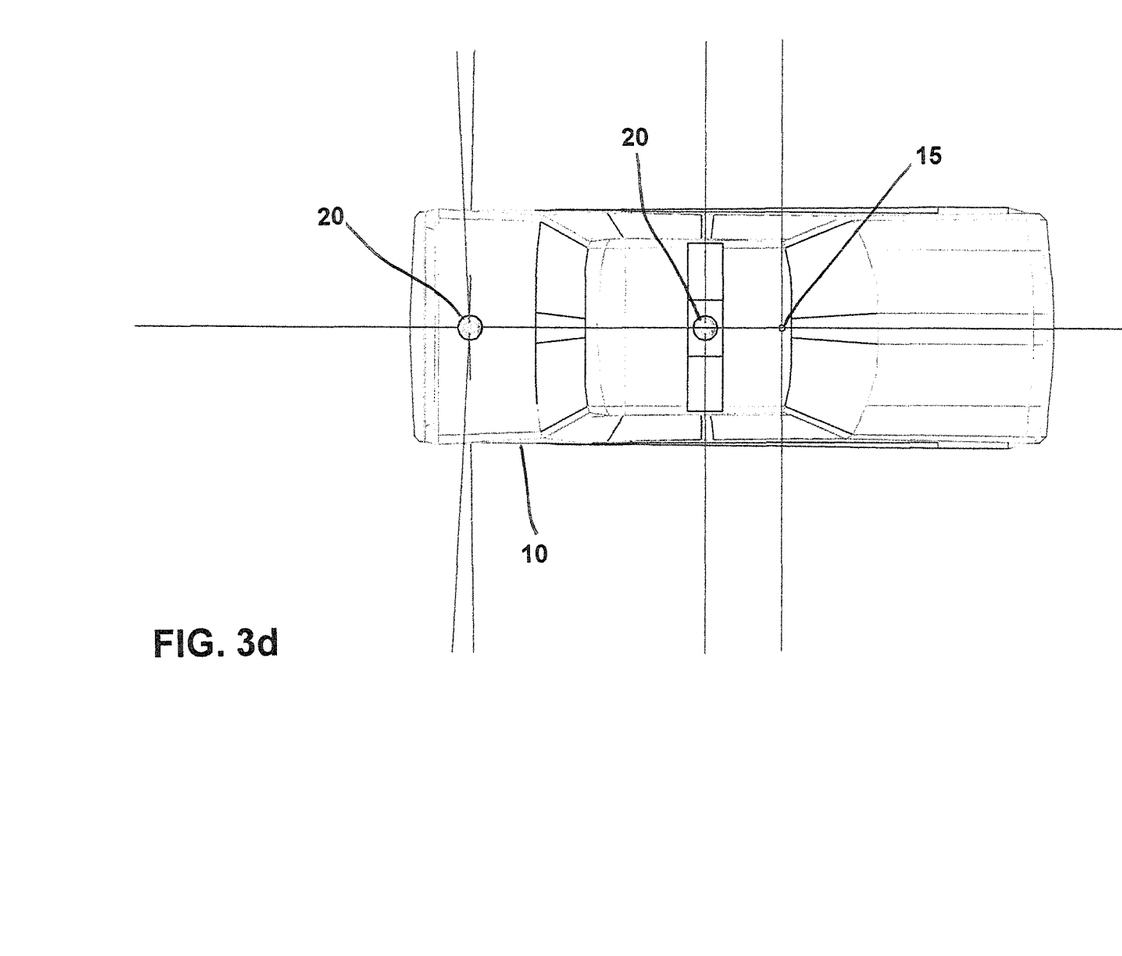
Figure 3E:
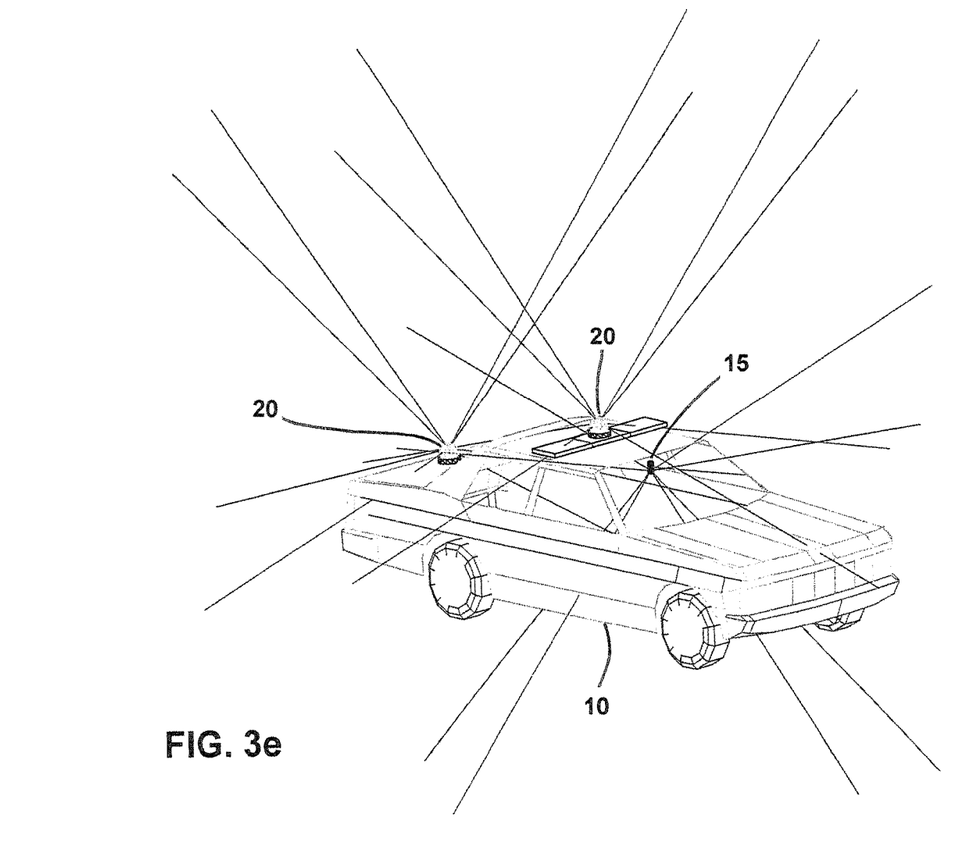

FIG. 2 is a detailed schematic block diagram of the schematic 360° camera system 100 in accordance with the invention. With reference to the FIG. 2, the 360° camera system 100 is available/applicable to first responders, such as police officers and other emergency service providers. Depending on the size of the vehicle 10, the 360° camera system is provided with two to three 360 degree cameras 20 placed at various locations inside and outside the vehicle on a 24 hour standby that is hard wired and powered via the battery system of the vehicle 10. Smaller vehicles are provided with one 360° camera 20 on the exterior roof of the vehicle 10 and one 360° camera 15 connected to the interior roof, such that recordings of the interior and exterior of the vehicle 10 are achieved. Large vehicles, on the other hand, are provided with an additional 360° camera 20 that is added to the exterior roof at the rear of the vehicle 10. Exemplary 360° cameras include the Theta V 360 Spherical Camera manufactured by Ricoh, the Gear360 manufactured by Samsung, the Virb 360 manufactured by Garmin, the iO manufactured by Giroptic, or the Air manufactured by Insta360. It should be understood these cameras are merely exemplary and provide the function commensurate with the system in accordance with the invention. The structure of these exemplary cameras moreover is merely exemplary and it should be understood the structure of the 360° camera utilized in the 360° camera system 100 in accordance with disclosed embodiments may be reconfigured as necessary to permit proper installation.

Any camera located on the exterior of the vehicle 10 is encapsulated in a housing consisting of materials that can withstand weather conditions and are Ingress Protection (IP) 67 rated to withstand water, dust, and shock. The 360° camera, when mounted to the top of the vehicle 10, is secured by a choice of either screws or magnetic plate. In preferred embodiments, the housing is made of a polycarbonate or acrylic shell arranged over the 360° camera 20 with a hydrophobic coating that sits on top of a base made of robust materials that withstand harsh weather conditions. Each housing also includes infrared lighting 40 arranged around the base that permits low light filming. The housing also includes a heating/cooling element to protect the internal hardware from severe weather conditions. All wiring is sealed with weatherproof materials.

The 360° camera system 100 includes a software program executing on a conventional computer system that allows a central command center or dispatcher 40 to locate and view in real-time any selected camera via an encrypted secure wireless connection. The command center or dispatcher 40 can observe a complete 360° horizontal and up to 90 degree vertical view being captured by a 360° camera 20 at a specific location. The 360° camera system 100 also includes a crash detection system, as well as GPS/telemetry integration.

The wires of the roof mounted 360° camera(s) protrude from the bottom of the camera housing through the roof of the vehicle 20. All vehicle 360° cameras 20 of the 360° camera system 100 are connected to a secure communication network of the vehicle 10 via a communication cable, such as an RJ45 cable. The user (e.g., a police officer) can access the live view of the 360° cameras on the vehicle 10 via a mobile computer terminal 45 located within the vehicle 10.

The cameras of the 360° camera system 100 are activated to record by either the user at his/her location or by the dispatcher or central command center 30. In certain embodiments, the 360° camera system 100 records over an extended period of time, such as a 2 to 15 minute period of time, prior to activation to gather video footage that may be deemed crucial or critical to an event. In a preferred embodiment, the time period for the prior activation is 2 to 10 minutes. In certain embodiment, the 360° camera system 100 records from 720p to 4K quality during the daytime, whereas night time recordings are limited to 480p to 1080p.

The 360° camera system 100 includes an airborne recording system 75 (i.e., drone) that provides an additional viewing angle. The drone 75 allows viewing from a controller with a viewing screen/heads-up display attached to a helmet or via goggles/remote, live monitor or any, body-worn video monitor. In accordance with the invention, drone footage can be viewed live, remotely over the secure network of the vehicle 10. In certain embodiments, the drone 75 is operable by 1-2 people, i.e., a pilot/video observer.

The drone 75 is connected to the in-vehicle secure communication network of the vehicle 10 for controlling, recording and viewing purposes. The drone 75 is controllable by a person via a hand held controller/controller attached to the body/remote pilot. In accordance with the invention, the drone 75 follows the first responder, such as a police officer, via a GPS or similar type locator activated by the first responder via the listed controls. The drone 75 can fly pre-planned missions/planned video capture routes, such as orbiting the officer, follow the officer, or clear buildings. Other features of the drone 75 include the ability to be flown manually, and it contains a smart computer that integrates GPS/multi axis sensors/collision avoidance/all flight controls of the drone 75.

Along with recordings by the 360° cameras, 20, recordings or drone footage are also provided by the drone 75 to DVR 50 in the vehicle 10 and/or to the dispatcher or central command center 30. Drone footage or recordings seamlessly integrate with footage or recordings by the 360° cameras 20 of the vehicle. Activation of the drone 75 automatically starts full system recording, i.e., the 360° cameras and the drone 75 begin recording. Moreover, the drone 75 is connected to the secure network of the vehicle 10.

Drone footage is obtained in two lighting scenarios, i.e., daytime and nighttime. During daytime, exemplary recording resolutions of 1080p/2.7K/4K/8K resolution capabilities are provided. On the other hand, nighttime recordings are performed with "FLIR style" cameras (Infra-Red (IFR)/Heat Signature) with or without drone mounted IFR Lights.

In a conventional manner, the camera of the drone 75 is connected to a gimbal (not shown) for stabilization, which is controlled by the drone's internal computer. It should be understood the drone camera can be attached and detached with a quick connector/adapter on the gimbal. The video feed/footage of the drone camera is sent over the network (Cellular or Wi-Fi) connected to the drone 75 to be viewed live and recorded. The drone camera records at a Frames Per Second (FPS) speed of, for example, 24 FPS, 30 FPS, 60 FPS, 120 FPS or 240 FPS. It should also be appreciated all drone cameras have zoom and telescoping capabilities.

While awaiting activation, the drone 75 is configured to be stored in a vehicle roof mounted weather proof housing that automatically opens upon activation and charges the drone 75 (e.g., wired/wirelessly) while on standby. The drone 75 can also be stored in a hard case, mounted in the vehicle 10, which charges (e.g., wired/wirelessly) the drone while on standby. In other embodiments, the vehicle 10 is provided with a powered tether that permits connection of the drone 75 to obtain enhanced power from the vehicle power system.

In accordance with disclosed embodiments, a small microphone with an electronic button 87 is provided with each 360° camera system 100 that is worn by the user 55, and when the button 87 is pushed the 360° camera system 20 becomes activated and begins recording. In addition, a GPS location and an emergency signal are sent to the dispatcher or central command center 30. Each 360° camera system 100 is provided with an onboard recording system 50, such as a digital video recorder (DVR), in order to temporarily store recorded video footage until the vehicle 10 arrives within a secure Wi-Fi hotspot area located near the central command center 30. Upon arrival, the video is wirelessly transferred and stored into mainframe computers 35 located at the central command center 30 for safe, secure storage. In other embodiments, the recorded video footage is not stored in the onboard recording system (DVR) 50 of the vehicle 10 but is, instead, uploaded directly to a remote cloud based server 90.

Access to the 360° camera system 100 is accomplished several ways, such that almost any "what if" scenario is covered where, in each one of these activations processes, a highlighted tag starts the recording two (2) minutes prior to initiation of a record command.

For example, the 360° camera system 100 can be activated by software installed on the main frame computer 35 at the dispatcher or central command center 30, and command staff at the dispatcher or central command center 30 can initiate recordings during an emergency. As a result, live viewing of any 360° camera 20 of the 360° camera system 100 over the wireless secure network can be performed. When the dispatcher or a supervisor initiates a recording, a command is sent over the wireless network to start recording and highlight any footage currently being captured by a 360° camera 20 or the 360° camera system 100.

It is also possible to start recordings with a highlighted tag via an in car control panel either standalone (activation of lights) or on the in-vehicle mobile computer terminal 45. In other embodiments, camera recording is activated by a signal command sent by a crash detection processor 95 to the DVR 50 located within the vehicle 10, and a highlighted tag is initiated.

In further embodiments, the user carries a rechargeable microphone unit 105 that contains an emergency button. Here, a record on/off button, a power button and a GPS unit 110 are all provided. The microphone unit 105 sends audio wirelessly back to the in car recording system (i.e., the DVR 50), which then integrates the audio into the video recording when a recording is activated by the body worn microphone 105. A command is sent wirelessly from the microphone 105 to the in car recording system, such as the DVR 50.

In an emergency, a first responder (i.e., a police officer) can push the emergency button on the microphone 105 which will send a command to initiate recording with a highlighted tag, a notification to dispatch of a pending officer emergency, and the exact location of the officer and vehicle 10 at the moment of activation. This command is sent wirelessly from the microphone 105 to the in car recording system, such as the DVR 50.

In more detail, the user 55 is provided with a 360° body camera system 80 which is connected to the in-vehicle secure communication network for recording purposes. Once the user 55, such as a police officer, is within range of the vehicle 10, the body camera footage will automatically upload onto the vehicles main storage drive to clear space for further usage. Once the user 55 is within range of the police station 55, all vehicle/drone/body camera footage is uploaded to the secure department server 115 for a client specified duration of time.

The 360° body camera system 80 includes audio/video recording once the emergency button of the microphone 105 worn on the body of the user is pressed, or when the drone 75 is activated. Audio/video recordings are seamlessly integrated with drone 75 and vehicle 10 recorded footage. In certain embodiments, the 360° body camera system 80 is attached to a shoulder plate/pad/attachment (not shown) on an upper-torso worn bullet resistant vest. Here, the vest is provided with openings for each shoulder/arm and head of the user 55. The 360° body camera system 80 records to a storage unit 85 attached to the vest, a storage device 85' located inside the 360° body camera system 80 housing, or wirelessly to the in-vehicle storage 25. When the 360° body camera is activated, full system (drone/vehicle/body camera) recording is automatically started.

The 360° body camera system includes two 360° cameras mounted on the user 55 via clothing or any type of conventional attachment mechanism. The two 360° cameras provide a seamless 360° recording around the user. As with the drone 75, the 360° body camera system permits daytime and nighttime recordings. During daytime, recording resolutions of, for example, 1080p/2.7K/4K/8K are provided. On the other hand, nighttime recordings are performed with "FLIR style" cameras (Infra-Red (IFR)/Heat Signature) with or without drone mounted IFR Lights. Here, the 360° body camera system also records at a Frames Per Second (FPS) speed of, for example, 24 FPS, 30 FPS, 60 FPS, 120 FPS or 240 FPS. It should also be appreciated the two 360° cameras that form the 360° body camera system cameras also have zoom and telescoping capabilities.

The cameras are also activated when the emergency lights on the vehicle have been turned on. Here, a connection from the emergency vehicle lighting system activates a switch that sends a start record command with a highlighted tag. The recording ends when the first responder (e.g., the police officer) manually turns off the recording via a stop button on the onboard recording system, such as the DVR.

In accordance with the disclosed embodiments, image or video storage is not on the actual camera 20 itself but, rather, images or video are stored on the in-vehicle recording system, e.g. the digital video recorder 50. The images or video are/is transferred directly from the cameras to the mainframe computers 35 located at the central command center 30. All video footage is wirelessly uploaded to the central command once the in-vehicle recording system (e.g., the DVR) is within range of a station or home based Wi-Fi. In preferred embodiments, the range is from 100 to 200 yards.

In alternative embodiments, the 360° camera system 100 is provided to the civilian sector and automakers in a modified form. Here, the modification consists of elimination of the wireless uplink to the command center or dispatcher 40, the airborne recording system (i.e., the drone) 75 and the 360° body camera system 80 are eliminated. In addition, software for uploading video footage to the mainframe computers 35 located at the central command center 30 is also not provided because there is no need for the modified form of the 360° camera system 100 to upload video footage to a central authority. Instead, video footage is recorded to the digital video recorder (DVR) 50, which then could be accessed by third parties such as insurance companies, police agencies or any other entities, after a vehicular accident.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A 360° camera system comprising:
   a dispatcher or central command center;
   a plurality of 360° cameras fixedly attached to a vehicle and connected to a secure communication network of the vehicle;
   a digital video recorder (DVR) operatively coupled to the plurality of 360° cameras, said DVR temporarily storing video footage acquired by the plurality of 360° cameras for upload to the dispatcher or central command center;
   at least one 360° camera assigned to a first responder, said at least one 360° camera being in wireless communication with the vehicle to upload additional video footage to the DVR;
   a mobile computer terminal arranged within the vehicle and providing real-time viewing of the video footage acquired by the plurality of 360° cameras; and
   an airborne recording system which wirelessly uploads further video footage to at least one of the (i) DVR and (ii) dispatcher or central command center;
   wherein all cameras of the 360° camera system are activated when the emergency lights on the vehicle are turned on.

2. The 360° camera system of claim 1, wherein the dispatcher or central command center includes a main frame computer.

3. The 360° camera system of claim 2, wherein the main frame computer executes software program that allows a dispatcher or a person at the central command center to view a live video feed of each of the 360° cameras on the vehicle.

4. The 360° camera system of claim 2, wherein the command center or dispatcher is provided with a complete 360° horizontal and up to 90 degree vertical view being captured by any 360° camera of the plurality of 360° cameras and the at least one 360° camera assigned to the first responder at a specific location.

5. The 360° camera system of claim 1, wherein all video footage stored in the DVR is uploaded from the vehicle to the dispatcher or central command center when the vehicle arrives within a secure Wi-Fi hotspot area located at the dispatcher or central command center.

6. The 360° camera system of claim 1, wherein at least one 360° camera of the plurality of 360° cameras is located or placed on top of the vehicle, and one 360° camera is located in the inside of the vehicle.

7. The 360° camera system of claim 1, wherein the 360° camera system 100 records over an extended period of time.

8. The 360° camera system of claim 1, wherein the extended period of time is in a range of 2 to 15 minutes.

9. The 360° camera system of claim 1, wherein recording resolution is in a range of 720p to 4K quality during daytime and recording resolution is in a range of 480p to 1080p at night time.

10. The 360° camera system of claim 1, wherein drone footage is viewable live, remotely over the communication network of the vehicle.

11. The 360° camera system of claim 1, wherein activation of the airborne recording system automatically starts full system recording.

12. The 360° camera system of claim 1, wherein recordings by all cameras of the 360° camera system are activated by a signal command sent by a crash detection processor to the DVR located within the vehicle.

13. The 360° camera system of claim 11, wherein full system recording comprises footage recording by the plurality of 360° cameras, the at least one 360° camera assigned to the first responder and footage recording by the airborne recording system.

14. The 360° camera system of claim 1, wherein the at least one 360° camera of the first responder includes a microphone unit with a record on/off button.

15. The 360° camera system of claim 14, wherein the microphone unit further includes a power button and a GPS unit.

16. The 360° camera system of claim 1, wherein a further plurality of 360° cameras are assigned to the first responder which provide seamless 360° recording around the first responder.

* * * * *